(No Model.) 3 Sheets—Sheet 1.
G. W. BEARD.
CAR FENDER AND BRAKE.
No. 554,167. Patented Feb. 4, 1896.
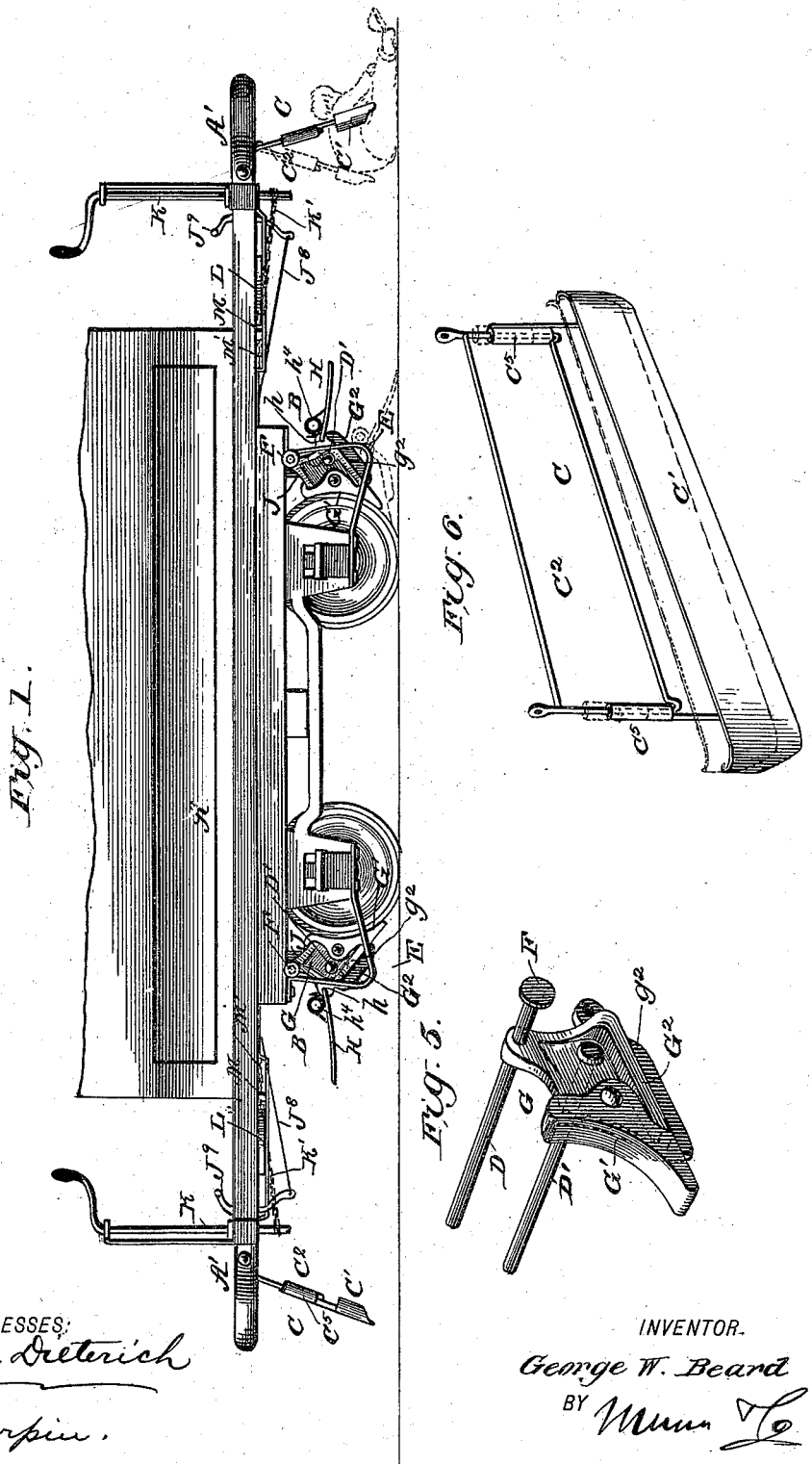
WITNESSES:
Fred G. Dieterich
P. B. Turpin.
INVENTOR.
George W. Beard
BY Munn & Co.
ATTORNEYS.

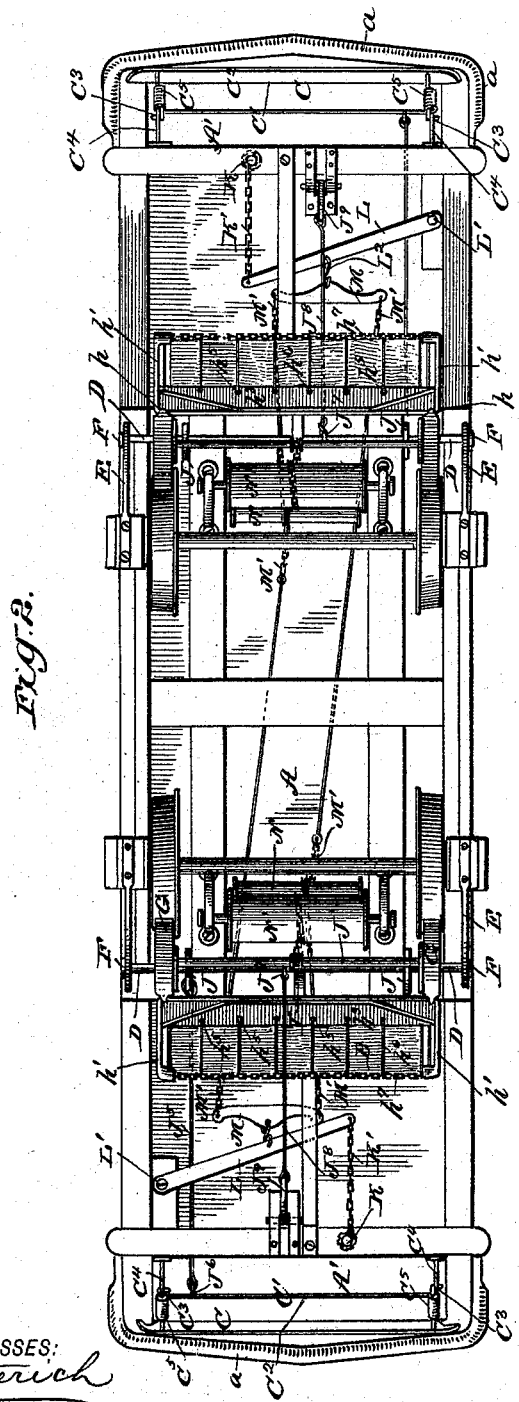

(No Model.) 3 Sheets—Sheet 3.
G. W. BEARD.
CAR FENDER AND BRAKE.
No. 554,167. Patented Feb. 4, 1896.
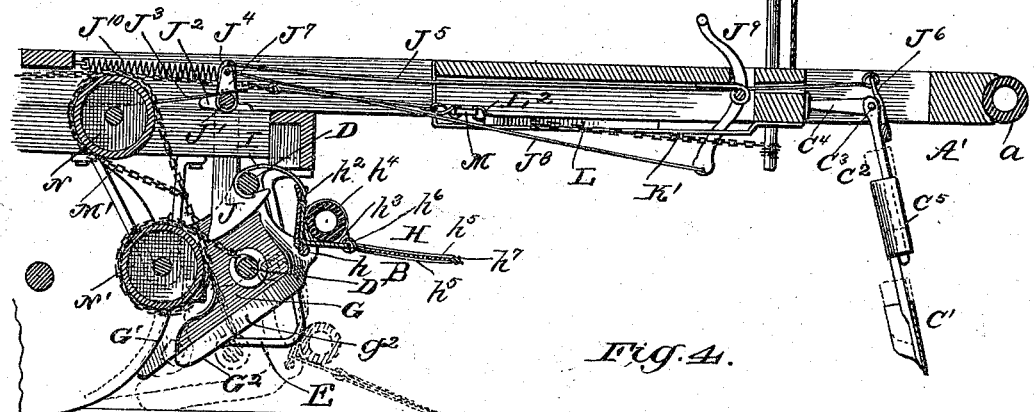
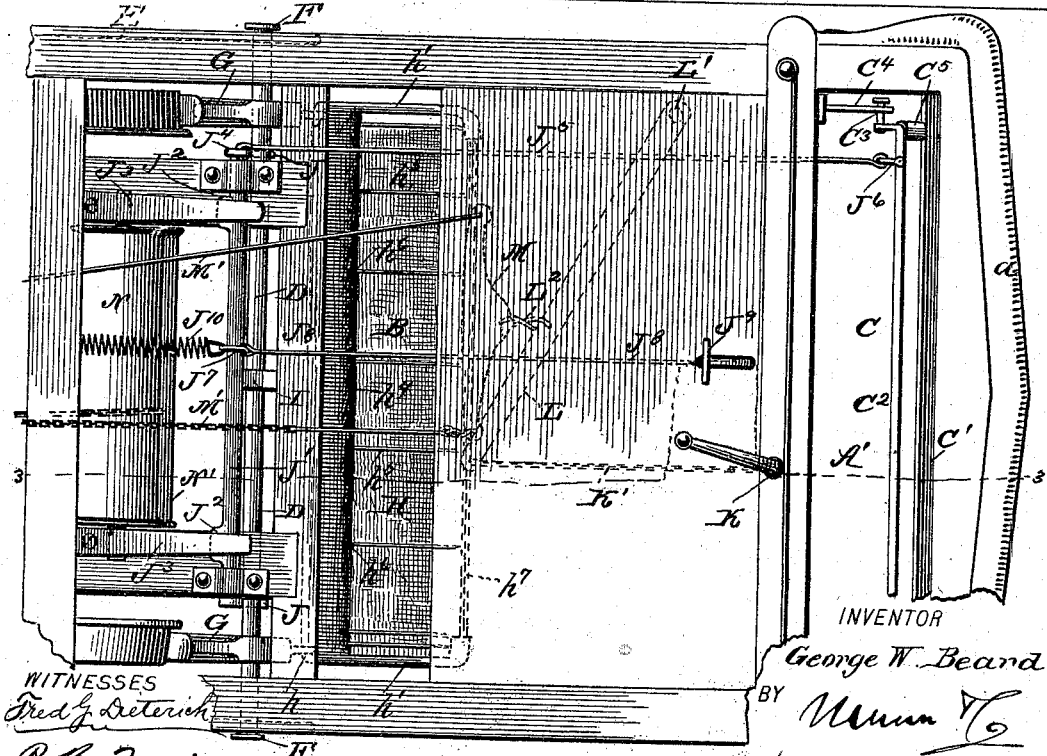
WITNESSES
Fred J. Dieterich
P. B. Turpin
INVENTOR
George W. Beard
BY
ATTORNEYS.

UNITED STATES PATENT OFFICE.

GEORGE W. BEARD, OF BALTIMORE, MARYLAND, ASSIGNOR OF TWO-THIRDS TO JOHN W. ERDMAN AND CHARLES F. SCHWEIZER, OF SAME PLACE.

CAR FENDER AND BRAKE.

SPECIFICATION forming part of Letters Patent No. 554,167, dated February 4, 1896.

Application filed December 2, 1893. Serial No. 492,567. (No model.)

*To all whom it may concern:*

Be it known that I, GEORGE W. BEARD, of Baltimore city, in the State of Maryland, have invented a new and useful Improvement in Car Fenders and Brakes, of which the following is a specification.

My invention is an improvement in car-fenders, and seeks to provide a combination car fender and brake—a fender which is automatically operated and which is at the same time under control of the operator; and the invention has for further objects other improvements; and it consists in the novel constructions and combinations of parts, as will be hereinafter described and pointed out in the claims.

In the drawings, Figure 1 is a side view of a part of a car provided with my improvements. Fig. 2 is a bottom plan view of a car provided with my improvements. Fig. 3 is a partial vertical section on about line 3 3 of Fig. 4. Fig. 4 is a top plan view of a part of the improvements, and Figs. 5 and 6 are detail views.

The car A may have its frame, wheels, trucks, platform, &c., in general respects of ordinary construction.

By my improvement I provide a fender proper, B, and a front or tripping frame, C, in advance thereof and connections whereby contact of a person or other obstruction upon the track with the tripping-frame will operate to adjust the fender into position to catch such person and prevent his getting under the wheels. This front frame, C, is made in two sections $C'$ and $C^2$, the former or edge section being arranged to extend across the track and rest normally close to the surface thereof, and the latter or main section, $C^2$, being pivoted at $C^3$ to suitable supports, which may be brackets $C^4$, as shown. This pivoting of the main section permits the tripping-frame to swing back and forth, and it is held normally by spring devices, presently described, at an angle, and inclining forward toward its lower edge.

The lower or edge section has a sliding connection with the upper or main section, as shown at $C^5$, so that if in use the body, arm, or leg of a person upon the track should get under the said section it will not crush such part as the tripping-frame swings backward, but will yield upwardly and pass over such part without injury to it. This tripping-frame is arranged under the platform $A'$ of the car, and in its normal position no part of the tripping-frame projects in advance of the front edge of the platform $A'$, and such edge is cushioned preferably by means of a hollow elastic tube $a$ secured along the same, as shown. This is preferred, because if the car should strike a person standing on the track it would not be so likely to break his arms or otherwise injure him as if the platform edge were not cushioned, and this cushion being arranged relatively to the tripping-frame, as shown and described, causes a person to be first struck by a cushioned surface before he comes in engagement with the tripping-frame.

Before describing the connections between the tripping-frame and the frame which supports the fender proper and the brake-shoes I will first describe this last-named frame and the fender and shoes in detail. This frame comprises a main cross-shaft D which protrudes at its ends through guide-frames E secured to the truck and has on its outer ends heads or flanges F, which by engaging outside the rods of the guide-frame will prevent lateral play and preserve the brake-shoes and fender proper in the desired position. These guide-frames E are also useful as stops limiting the downward movement of the frame and attached parts and preventing the brake-shoes from passing entirely under the wheels.

The brake-shoes G are made fast to the main cross-shaft D, and also to a second lower cross-shaft, $D'$, and the fender proper, H, is pivoted at $h$ preferably to the brake-shoes, as shown. Each brake-shoe is formed with two rub-surfaces $G'$ and $G^2$, the former being arranged to bear against the periphery of the wheel, and the latter, $G^2$, being arranged to bear upon the track and having a flange $g^2$ which may be arranged, as shown, to bear alongside the ordinary T-rail, or may be suitably arranged to run in the groove of a channeled rail, as desired. These two rub-surfaces $G'$ $G^2$ are separable, so that in case the surface $G'$, which receives most of the wear being applied on all occasions, becomes worn it may be replaced, the rub-section $G^2$, which only receives wear in case of emergency, remaining.

The fender proper, H, is pivoted at $h$ and has side bars, $h'$, and a top bar, $h^2$, against which is secured a cross-plate $h^3$ having upper and lower wings bent at about right angles to each other, and in the hollow of which is secured a hollow air-tube forming a cushion $h^4$ at the top of the fender. Rods $h^5$ are secured by suitable eye connections at $h^6$ to the lower edge of the plate $h^3$ and extend downward and connect with a chain $h^7$ which is extended between the lower ends of the side bars, $h'$, and forms the edge of the fender proper which bears upon the track and by its flexibility will conform to the track and insure the taking up of any object thereon when the fender is properly lowered. Now this special form of sweeping edge of the fender is of special value in connection with the tripping-frame to automatically lower the fender as it enables the fender to rest clear of the track except when needed and when needed permits it to conform to and closely hug the track so as to take up any obstruction thereon.

This fender may be covered by wire-netting, canvas, leather or other suitable material desired. To limit the downward movement of the fender I provide it with a hook I which catches over the main shaft and limits the downward tilting of the fender.

In practice when the fender and brake-shoes are lowered the shoes are applied directly to the wheels and rails, binding tightly between the same. When lifted the fender and shoes are held by the latches J pivotally supported at their upper ends and spring-actuated. In the construction shown and as preferred the latches are supported upon a shaft $J'$ with which they are rigidly connected, and such shaft is spring-actuated to force the latches normally into engagement with the shaft. This spring actuation is preferably accomplished by providing the shaft $J'$ with cam-like bearings $J^2$ upon which press springs $J^3$ fixed to the truck or other frame.

In order to operate the latches by the movement of the tripper, I provide the shaft $J'$ with a crank-arm $J^4$ connected by a rod $J^5$ with a crank $J^6$ on the tripper, and I also provide a crank $J^7$ on the shaft $J'$ connected by a rod $J^8$ with a treadle $J^9$, arranged for operation by the gripman, motorman, or other operator. Thus it will be seen that the fender and brake may be automatically lowered by the action of the tripping-frame or may be at will by the operator using the treadle as described.

A spring $J^{10}$ connects the crank $J^7$ with the framing and tends to aid the flat springs in adjusting the latches, treadle, and tripping-frame into normal position after being forced backward in the operation of the improvement.

In order to bring the fender and brake-shoes back to normal position, and also to apply the brakes in the usual manner to the wheels as desired, I connect the hand-brake shaft K with the fender and brake-frame and guide the connecting devices in the manner I will now describe.

The chain $K'$ from the shaft K connects with a lever L pivoted at $L'$, and to this lever between its ends I connect, by a short chain $L^2$, a yoke M, to the opposite ends of which are connected chains $M'$ $M'$, one of which connects with the adjacent fender and brake-shoes and the other with the fender and shoes at the other end of the car, so that the application of the brakes at one end of the car applies both the front and rear brakes, and so that the fenders and brake when lowered can be raised from either end of the car.

In connecting the chains $M'$ with the fender and brake-shoe frames, they are carried over upper guide rollers or drums, N, thence down between the lower drum, $N'$, and the fender-frame, thence around and over the said drum $N'$, and extend down from said drum $N'$ and connect with the lower cross-shaft, $D'$, of the fender-frame, the pull on such frame being such as to draw the brake-shoes forward out of the hollow formed between the rail and wheel and enabling the freeing of the brakes without backing the car. At the same time when the brake-shoes and fenders are up in normal position the shoes may be readily set by the hand-brake shaft before described.

Having thus described my invention, what I claim as new, and desire to secure by Letters Patent, is—

1. The combination of the tripping-frame the brake-shoes and fender, a frame supporting said fender and shoes and provided with a cross-shaft, a rock-shaft having hook-like latches engaging such cross-shaft and provided with a projecting arm or lug and the tripping-frame connected with said arm or lug substantially as set forth.

2. In an apparatus substantially as described, the combination of the brake-shoes, movable downward from normal position to a point where they can bind between the wheel and rail, the devices whereby the same are held normally elevated the tripper for releasing said brake-shoes, and the brake-operating devices adapted to lift the shoes to normal position when lowered and to apply said shoes when in normal position substantially as and for the purposes set forth.

3. The combination in an apparatus substantially as described of the brake-shoes having on their opposite edges rub-surfaces arranged to bear against the wheel and rail, the fender pivotally connected with said shoes, the tripping-frame and connections substantially as set forth.

4. In an apparatus substantially as described a fender having its free take-up edge formed of a chain adapted to conform to the surface of the track substantially as set forth.

5. In an apparatus substantially as described the fender consisting of the side bars the chain connecting the lower ends of said bars, the top plate extended from side to side of the fender the bars connected at one end with said plate and at the other ends with the cross-chain and the netting or cover substantially as set forth.

6. The combination in an apparatus substantially as described of a pivoted fender having its free edge provided with a cross-chain adapted to conform to the surface of the track, such fender being normally elevated clear of the track the tripping-frame and connections between the said frame and the fender substantially as and for the purposes set forth.

7. In an apparatus substantially as described, the combination of the frame supporting the fender and brake-shoes the latch devices arranged to hold such frame elevated and comprising a spring-actuated rock-shaft, and operating devices connected with such rock-shaft substantially as set forth.

8. The combination of the vertically-movable frame adapted to support the fender and brake-shoes, the side guide and stop frames engaged by such frame, the spring-actuated rock-shaft, and the tripping-frame connected with the said rock-shaft substantially as set forth.

9. In an apparatus substantially as described, the combination of the fender and brake-shoes such parts being movable together up and down and being also pivotally jointed and separate operating devices for simultaneously setting and unsetting such parts substantially as set forth.

10. In an apparatus substantially as described, the combination with the rock-shaft having cams and latches and the frame arranged to be held and released by said latches, springs engaging said cams and devices for operating the rock-shaft substantially as set forth.

11. In an apparatus substantially as described, the combination of the tripping-frame pivotally supported and provided with a crank, the treadle the rock-shaft having a crank connected with that of the tripping-frame and a second crank connected with the treadle, the latches depending from the rock-shaft the frame held by said latches and a cross-shaft provided at its ends with heads or flanges and the side guide and stop frames engaged by the said heads or flanges substantially as set forth.

12. In an apparatus substantially as described, a frame movable vertically and provided with brake-shoes arranged to bind between the wheels and rails and a fender pivoted to said frame substantially as set forth.

13. In an apparatus substantially as described, the combination of the vertically-movable frame provided with brake-shoes, the fender pivoted to said frame, latch devices arranged to support said frame when elevated, and a tripping-frame connected with and adapted to operate said latch devices substantially as set forth.

14. The combination with a brake-shoe adapted to bind between the wheel and rail when lowered and movable vertically and adapted when raised to normal position to be applied in usual manner to the wheel, a latch for retaining the shoe in normal position, devices for automatically releasing said latch, the brake-applying devices and connections between the same and the shoe whereby such devices may operate to lift the shoe to normal position and set the same to the wheels when in such position, all substantially as and for the purposes set forth.

15. A fender for a car or other vehicle, the lower or ground margin of which is constituted by a chain, substantially as set forth.

16. A fender for a car or other vehicle the lower or ground margin of which is constituted by a chain and the breast or carrying surface of which rises from said chain, substantially as set forth.

17. A fender for a car or other vehicle the lower or ground margin of which is constituted by a chain and the breast or carrying surface of which is composed of a series of connections attached at their upper extremities to a point of fixed support, and at their lower extremities to the ground-chain referred to, substantially as set forth.

18. The combination in a car or other vehicle, of a pivoted fender, the lower or ground margin of which is constituted by a chain, mechanism for retaining said fender in an elevated position, and a trip device which acts upon the fender-retaining mechanism aforesaid to permit the release of the fender and its gravitative descent, substantially as set forth.

19. The combination of a fender proper connected to some part of the car to be thrown downward and normally rest above the rails of the track, a pair of brake plates or shoes secured to said fender but normally extending a distance above said rails out of contact with the car-wheels, and a guard or tripping device separate from said fender and pivotally connected to said car at a point some distance in advance of said fender and normally standing in position to come in contact with a body or obstruction on said rails before said fender contacts therewith, and intermediate devices whereby when said guard comes in contact with a body on the rails the lower edge of said guard will be thrown rearward and the forward edge of said fender will be thrown downward and the brake-shoes will be thrown under the adjacent wheels of the car all substantially as and for the purposes set forth.

20. In a car-fender the combination of the following elements a front guard or tripping device a fender movable from normal position down to a point close above the track, brake plates or shoes pivoted to said fender and adapted to position themselves between the wheels of the car and the track-rails and intermediate devices between the front guard or tripping device and the fender.

GEORGE W. BEARD.

Witnesses:
G. ERNST REARDON,
HOORY C. MATHIER.